US008678344B2

(12) United States Patent
Ehrne et al.

(10) Patent No.: US 8,678,344 B2
(45) Date of Patent: Mar. 25, 2014

(54) MOUNTING OF A VALVE PLATE ON A VALVE ROD

(75) Inventors: Florian Ehrne, Frumsen (CH); Thomas Blecha, Feldkirch (AT)

(73) Assignee: VAT Holding AG, Haag (CH)

( * ) Notice: Subject to any disclaimer, the term of this patent is extended or adjusted under 35 U.S.C. 154(b) by 300 days.

(21) Appl. No.: 13/009,147

(22) Filed: Jan. 19, 2011

(65) Prior Publication Data

US 2011/0108750 A1    May 12, 2011

Related U.S. Application Data

(63) Continuation-in-part of application No. PCT/AT2009/000474, filed on Dec. 4, 2009.

(30) Foreign Application Priority Data

Dec. 11, 2008   (DE) .................... 10 2008 061 315

(51) Int. Cl.
F16K 3/314    (2006.01)

(52) U.S. Cl.
USPC ............................. 251/87; 251/193; 251/326

(58) Field of Classification Search
USPC .................. 251/84, 87, 193, 326–329
See application file for complete search history.

(56) References Cited

U.S. PATENT DOCUMENTS

| 2,948,503 | A | * | 8/1960 | Williams ........................ 251/85 |
| 3,442,295 | A | * | 5/1969 | Ver Nooy ....................... 251/193 |
| 3,837,617 | A | * | 9/1974 | Eminger et al. ................ 251/87 |
| 4,706,934 | A | * | 11/1987 | Brown ............................ 251/87 |
| 5,641,149 | A | | 6/1997 | Ito |
| 5,667,197 | A | | 9/1997 | Boyd et al. |
| 6,056,266 | A | * | 5/2000 | Blecha .......................... 251/158 |
| 6,390,448 | B1 | | 5/2002 | Kroeker et al. |
| 6,390,449 | B1 | * | 5/2002 | Ishigaki et al. ............... 251/193 |
| 6,416,037 | B1 | | 7/2002 | Geiser |
| 6,431,518 | B1 | | 8/2002 | Geiser |
| 6,471,181 | B2 | | 10/2002 | Duelli |
| 6,702,252 | B2 | * | 3/2004 | Ben-Asher et al. ......... 251/129.2 |
| 6,966,538 | B2 | | 11/2005 | Hayashi et al. |
| 7,134,642 | B2 | * | 11/2006 | Seitz ............................. 251/193 |
| 2002/0088959 | A1 | | 7/2002 | Duelli |
| 2002/0130288 | A1 | | 9/2002 | Duelli |
| 2005/0139799 | A1 | | 6/2005 | Tomasch |
| 2007/0272888 | A1 | * | 11/2007 | Tichy ............................ 251/193 |
| 2008/0066811 | A1 | | 3/2008 | Duelli |

FOREIGN PATENT DOCUMENTS

| DE | 1055906 | 4/1959 |
| DE | 102008049353 | 4/2010 |
| JP | 2002009125 | 1/2002 |
| JP | 2002228043 | 8/2002 |

* cited by examiner

*Primary Examiner* — John Bastianelli
(74) *Attorney, Agent, or Firm* — Volpe and Koenig, P.C.

(57) ABSTRACT

A mounting of a valve plate (1) on a valve rod (2) using a cross member (3) extending transversely with respect to the valve rod (2) is provided. The cross member (3) is connected at a central connecting point (4) to the valve rod (2) and is connected at least two lateral connecting points (5, 6), which are situated on both sides of the central connecting point (4), to the valve plate (1). The cross member (3) has a spacing (a) from the valve plate (1) in a central section (17) which comprises the central connecting point (4) and sections of the cross member (3) adjacent to the central connecting point (4) at both sides. By a twisting of the cross member (3), the valve plate (1) can be pivoted relative to the valve rod (2) about a pivot axis (19) which is at right angles to the valve rod.

14 Claims, 11 Drawing Sheets

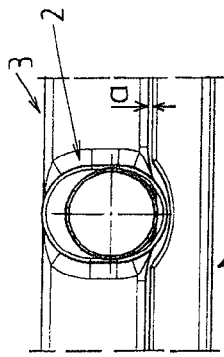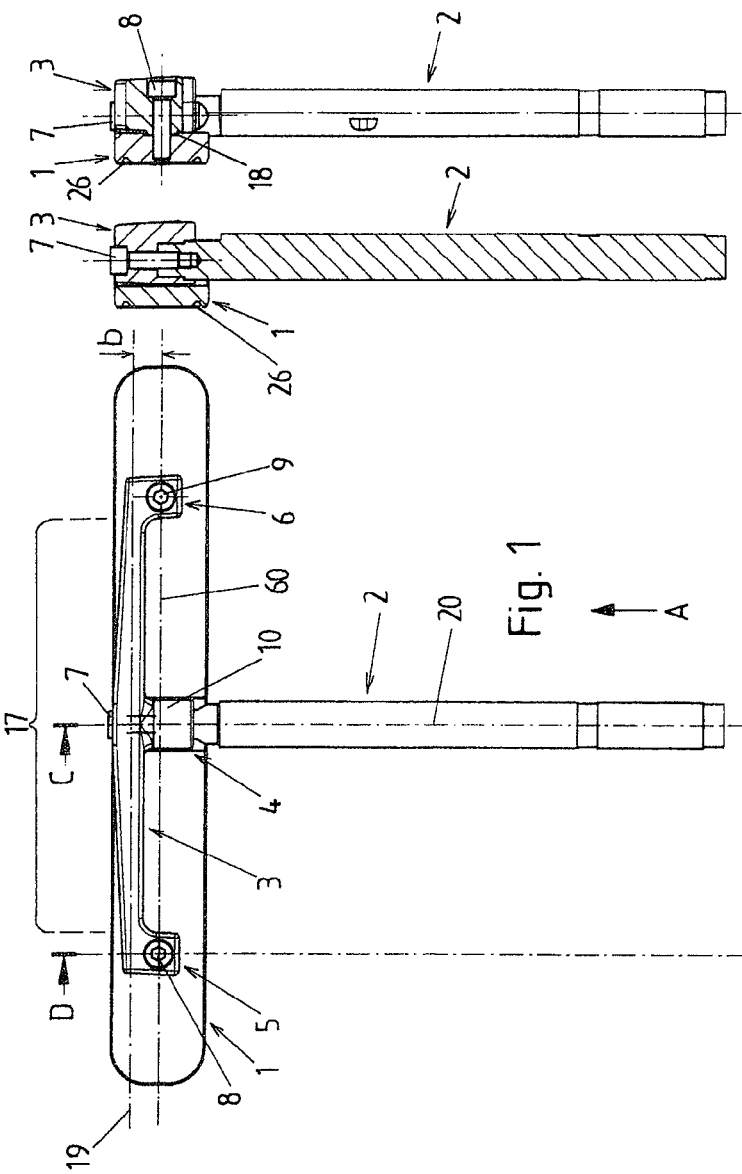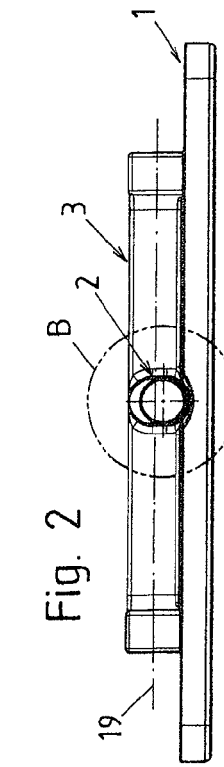

Figure 8:
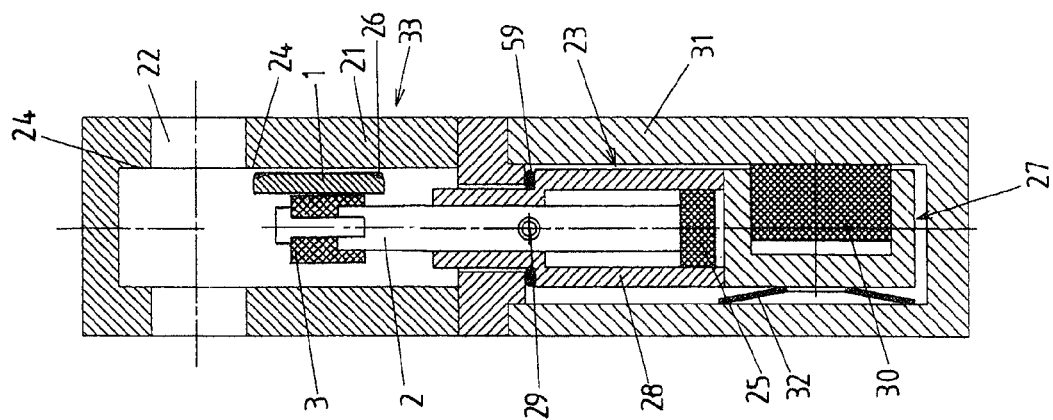

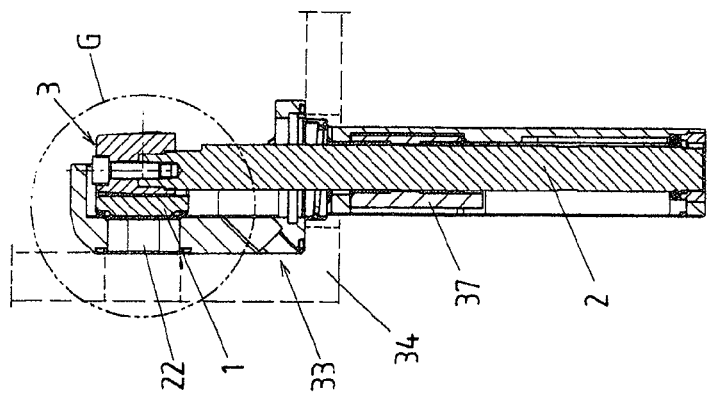
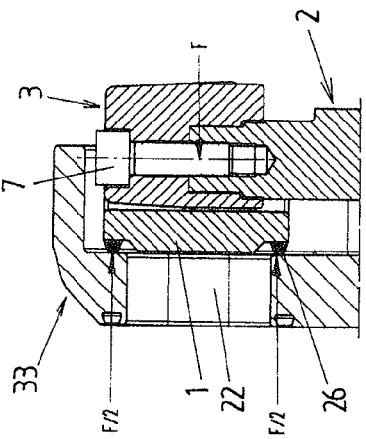
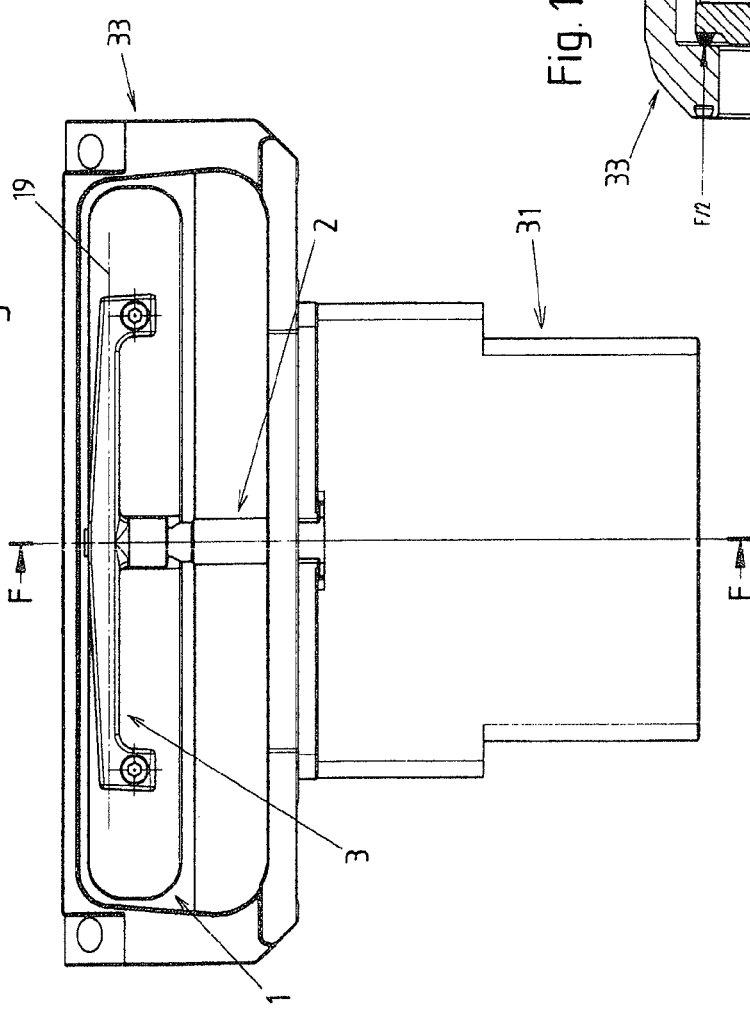

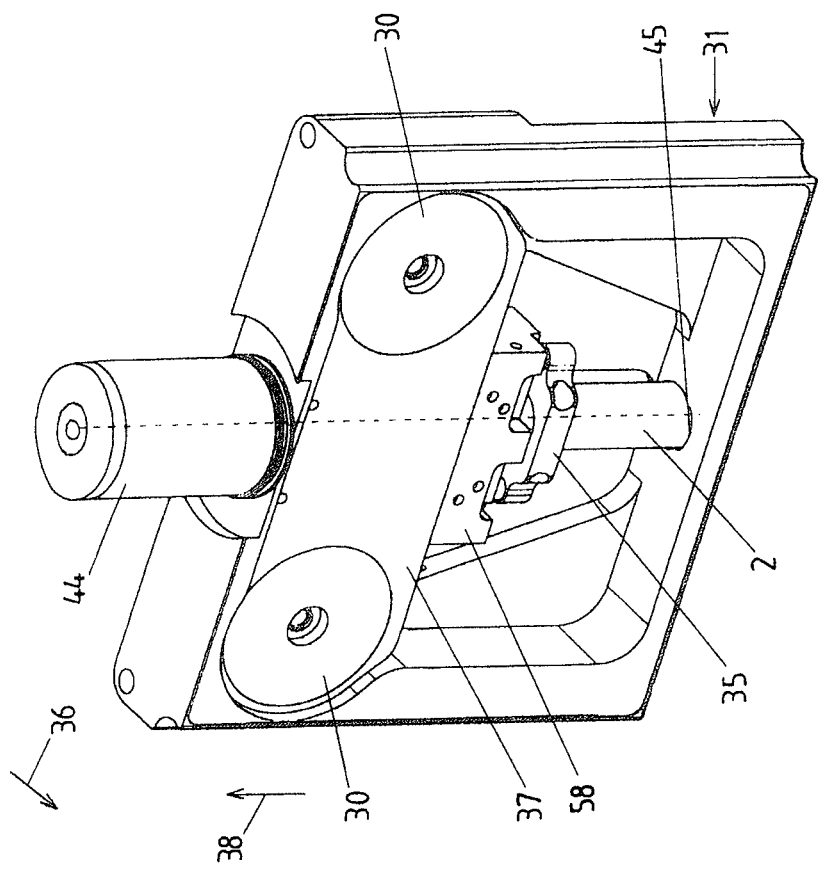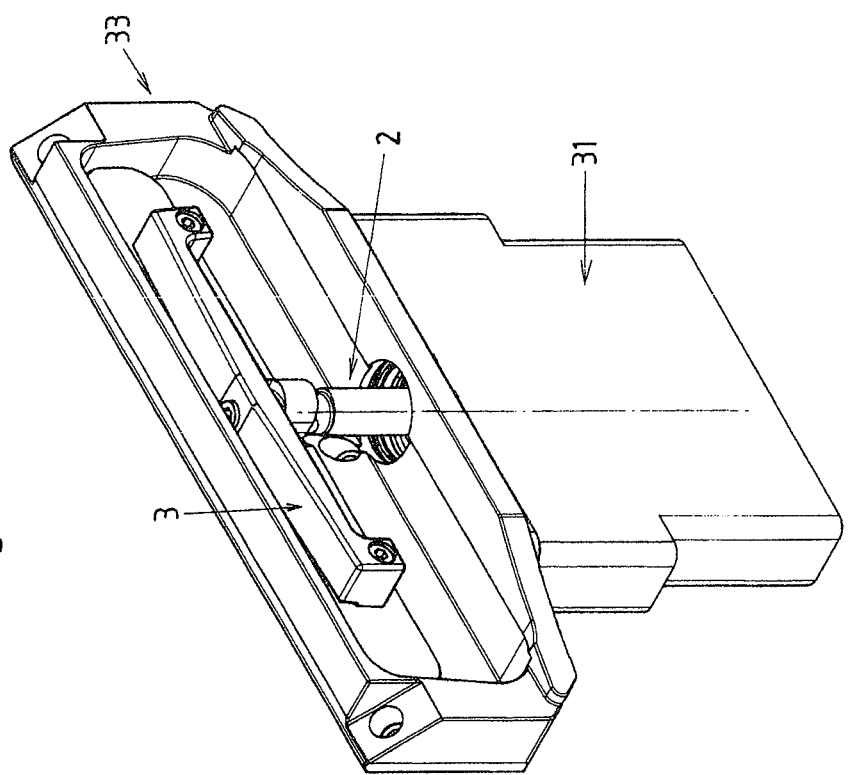

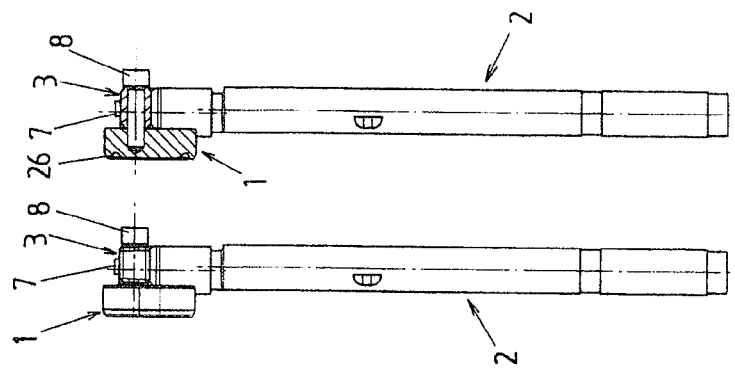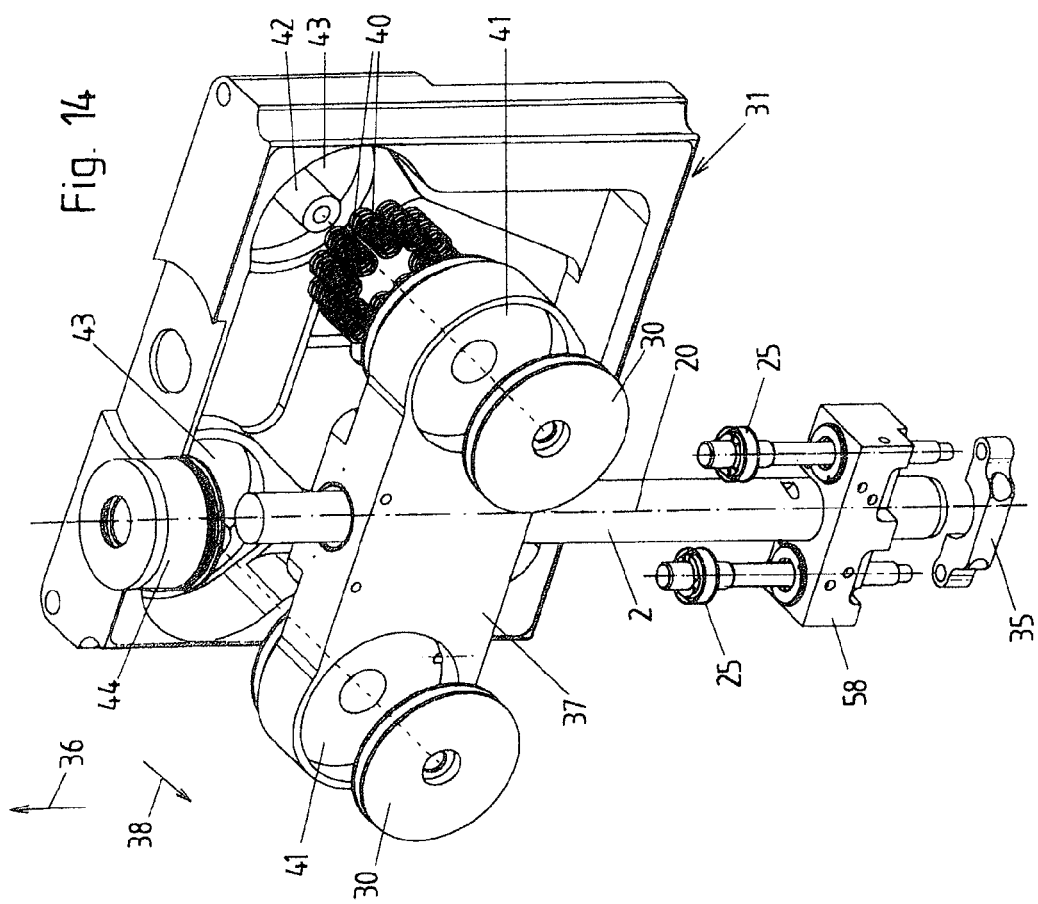

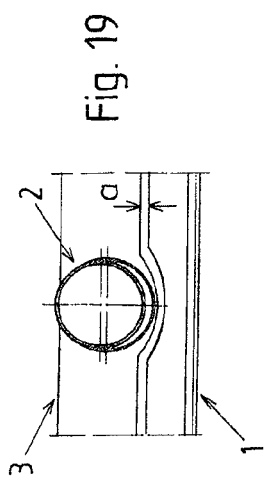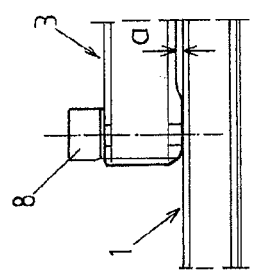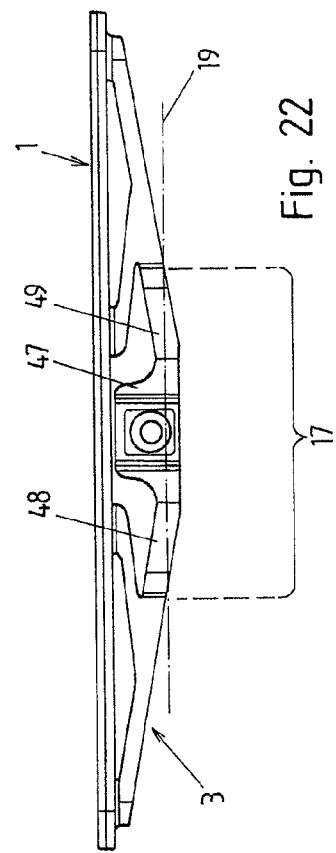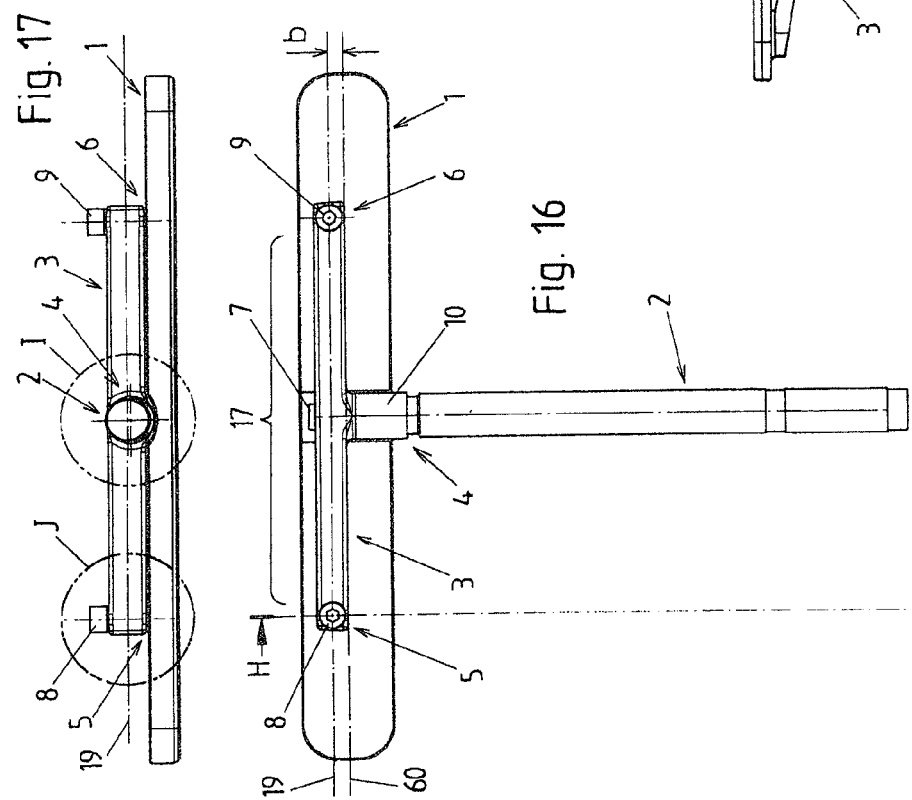

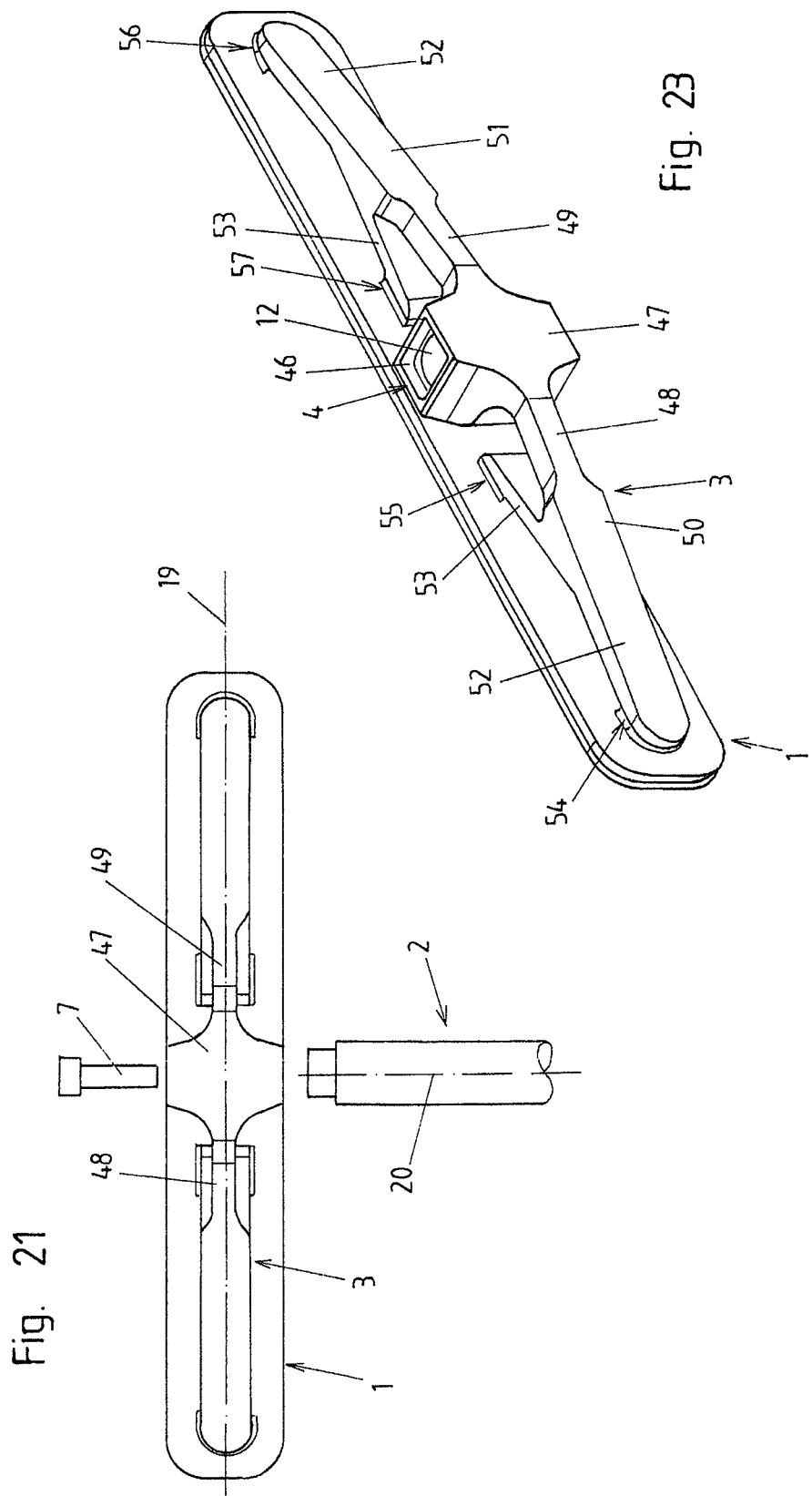

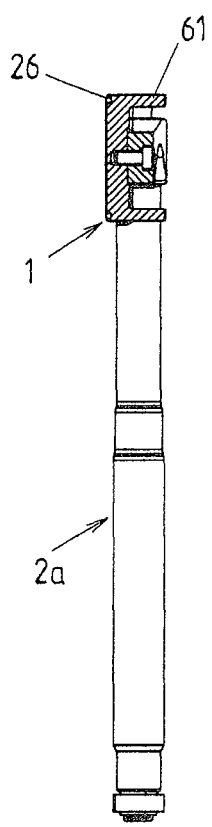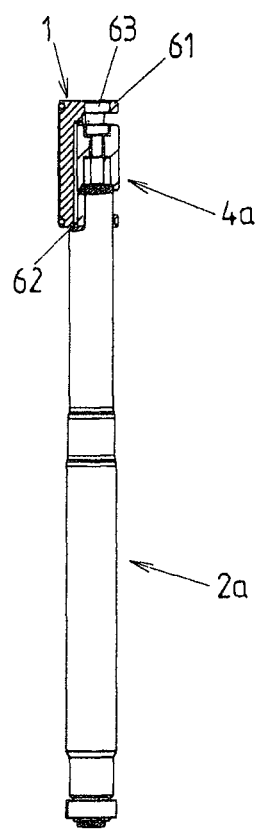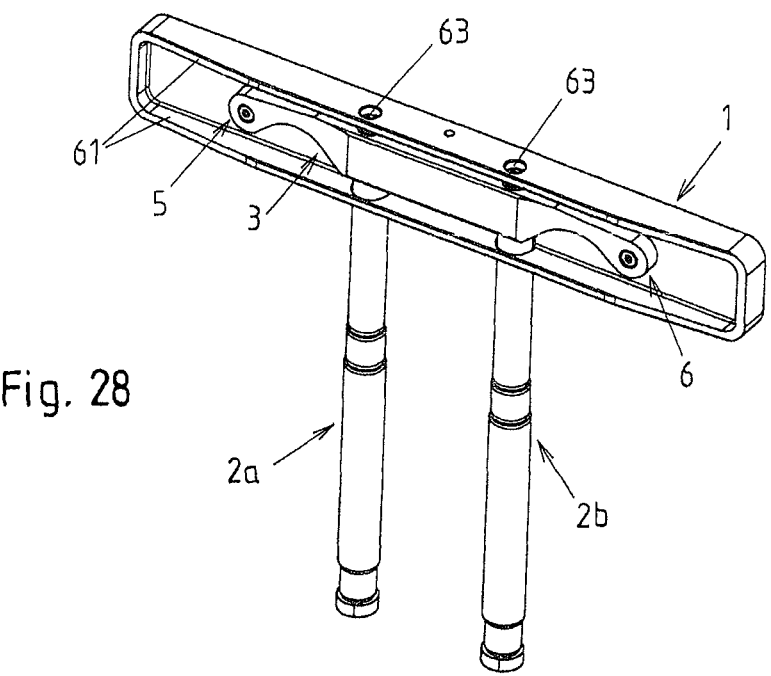

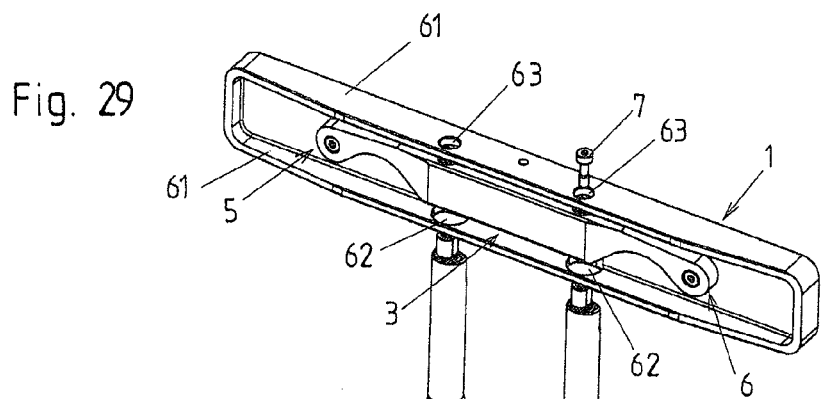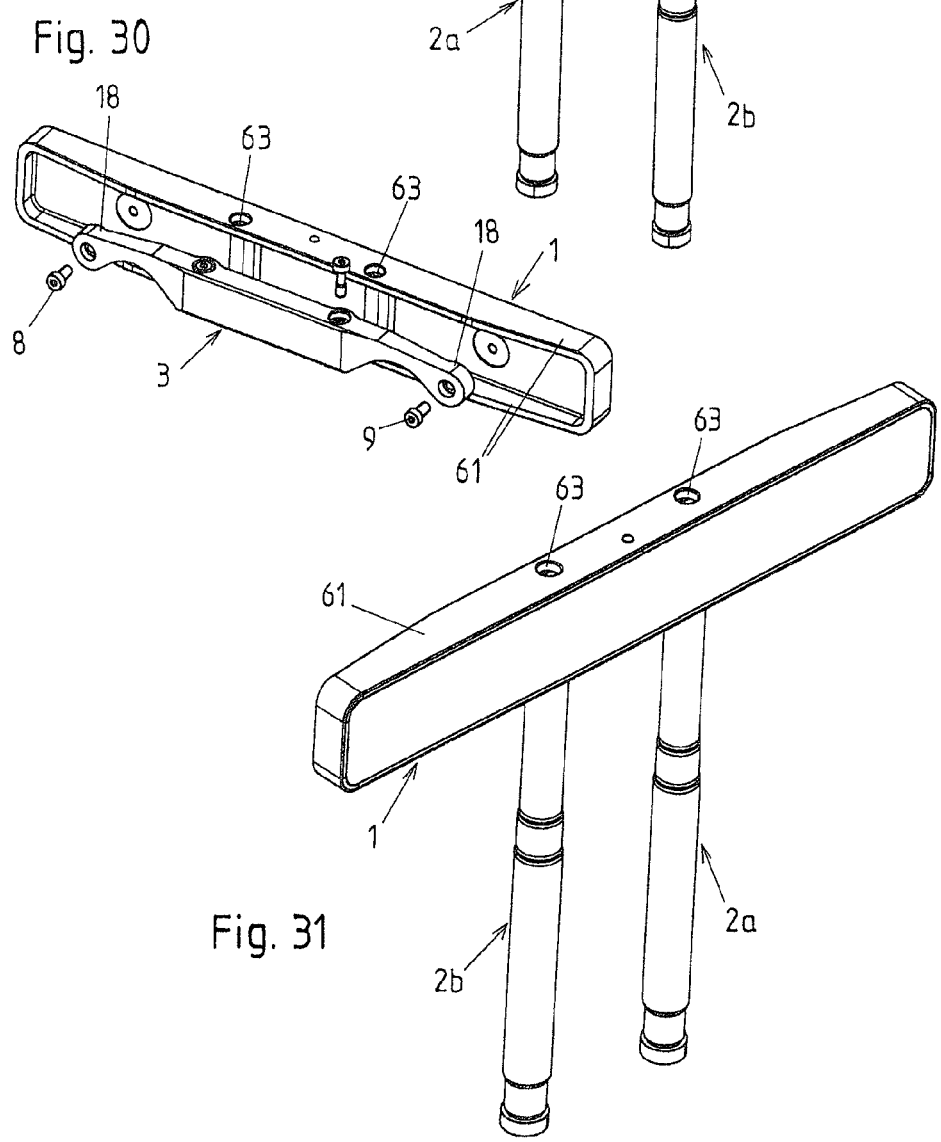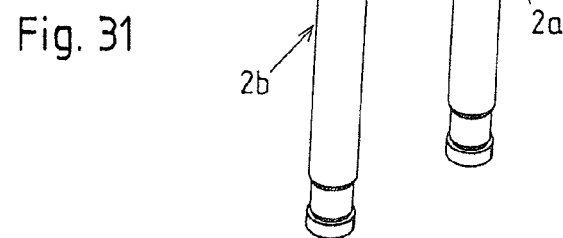

MOUNTING OF A VALVE PLATE ON A VALVE ROD

CROSS-REFERENCE TO RELATED APPLICATIONS

This application is a continuation-in-part of PCT/AT2009/000474, filed Dec. 4, 2009, which claims the benefit of German Patent Application No. 10 2008 061 315.0, filed Dec. 11, 2008, both of which are incorporated herein by reference as if fully set forth.

BACKGROUND

1. Field of the Invention

The invention relates to a suspension of a valve plate on a valve rod using a crossbar extending transverse to the valve rod, wherein the crossbar is connected to the valve plate at lateral valve-plate connection points and the at least one valve rod is connected to the crossbar at a or at each valve-rod connection point of the crossbar lying between the lateral valve-plate connection points, and the crossbar has a spacing from the valve plate in a middle section that encompasses the at least one valve-rod connection point of the crossbar and adjacent sections of the crossbar on both sides of this connection point, and wherein the valve plate can be pivoted relative to the at least one valve rod by a twisting of the crossbar about a pivot axis extending at a right angle to the valve rod and the crossbar twists when the valve plate pivots relative to the at least one valve rod.

2. Description of Related Prior Art

A suspension of the type noted above follows from the embodiment according to FIGS. 3-5 of U.S. Pat. No. 6,471,181 B2. A crossbar to be connected to the valve rod comprises a first plate that has a conical opening for holding the end of the valve rod that is screwed with the first plate. On both sides of the middle connection point with the valve rod, elastic support blocks are attached to the first plate, wherein second plates that are each screwed to the valve plate are attached on the sides of these blocks opposite the first plate. In the elastic support blocks, for example, cylindrical, force-transmitting elements are embedded. Through the elastic support blocks and the embedded force-transmitting elements, tilting about an axis extending at a right angle to the valve rod is made possible, wherein a more uniform contact pressure of the seal of the valve plate on the valve seat is achieved.

Such an ability of the valve plate to pivot about an axis lying at a right angle to the valve rod is advantageous especially for vacuum valves in which, by means of a freely projecting section of the valve rod, a closing force is exerted on the valve plate with which the valve plate is pressed onto the valve seat. The closing force transmitted by the valve rod results in a certain amount of flexure of the valve rod, wherein through a corresponding pivoting (for example, in the region of 0.5°) of the valve plate relative to the valve rod, the parallel alignment of the valve plate relative to the valve seat is achieved and the seal arranged on the valve plate or also on the valve seat is loaded uniformly.

Such vacuum valves with freely projecting valve rods are known, for example, in different embodiments in the form of L-valves. Such freely projecting valve rods are also present in so-called shuttle valves in which the valve rod is pivoted about an axis standing, e.g., at a right angle to the valve rod for displacing the valve plate from its position freeing the valve opening into its position covering the valve opening but lifted from the valve seat.

L-valves follow, for example, are known from U.S. Pat. Nos. 6,431,518, 6,416,037, 6,966,538, 5,641,149, and the non-published German Patent Application DE 10 2008 049 353.8.

Furthermore, from US 2008/0066811 A1, a vacuum valve is known in which a valve plate is connected to first and second crossbars. First piston-cylinder units are used for shifting the valve plate in its plane, in order to bring it from a position freeing the valve opening into a position covering the valve opening but still lifted from the valve seat. Tappets driven by second piston-cylinder units are used for pressing the valve plate onto the valve seat, with these tappets interacting with side ends of the crossbars. The crossbars are connected to the valve plate by connection elements. These have connection arms extending from a connection point with the crossbars on both sides in the longitudinal direction of the crossbar, with these arms being connected at the ends with a common connection leg extending in the longitudinal direction of the crossbar, with this leg being screwed onto the valve plate at several positions spaced apart in the longitudinal direction of the crossbar. In this way, a more uniform force transmission should be achieved in the longitudinal direction of the crossbars.

SUMMARY

The object of the invention is to disclose a simply constructed suspension of the type named above with which a certain amount of pivoting of the valve plate is made possible, for example, in the range of 1°, relative to the at least one valve rod about a pivot axis standing at a right angle to the at least one valve rod.

According to the invention, this is achieved by a suspension of a valve plate on at least one valve rod by a crossbar extending transverse to the valve rod, wherein the crossbar is connected to the valve plate at side valve-plate connection points and the at least one valve rod is connected to the crossbar at a or at each valve-rod connection point of the crossbar lying between the side valve-plate connection points, and the crossbar has a spacing from the valve plate in a middle section of the crossbar, with this section encompassing the at least one valve-rod connection point and adjacent sections of the crossbar on both sides of this connection point, and wherein the valve plate can be pivoted about a pivot axis extending at a right angle to the valve rod relative to the at least one valve rod through a torsion of the crossbar and the crossbar twists when the valve plate pivots relative to the at least one valve rod.

For the suspension of the invention, the ability of the valve plate to pivot relative to the at least one valve rod about a pivot axis extending at a right angle to the at least one valve rod is made possible by a twisting of the crossbar. In this way, a very simple construction can be achieved.

The pivoting of the valve plate about the pivot axis is achieved according to the invention by the torsion of the crossbar. This involves a twisting of the crossbar. Here, cross sections of the crossbar spaced apart in the direction of the pivot axis twist relative to each other as a whole.

The crossbar can be made advantageously completely from metal, e.g., with a single-material construction. Intermediate elements can be developed advantageously from elastomeric materials.

In one advantageous embodiment of the invention, the valve plate twists relative to the at least one valve rod by at least 0.2°, advantageously at least 0.3°, by a torque that acts on the crossbar about the pivot axis and equals 80 Nm by the twisting of the crossbar.

The crossbar can have a straight construction in one possible embodiment, wherein it extends parallel to the pivot axis. In other embodiments, it could also have sections running at an angle to the pivot axis. Here, its extent in the direction of the pivot axis is significantly bigger than in the direction parallel to the at least one valve rod or in the direction at a right angle to the pivot axis and at a right angle to the at least one valve rod. Preferably, its extent in the direction parallel to the at least one valve rod is at least 5 times greater than in the directions at a right angle to this direction.

In one advantageous embodiment of the invention, a single valve rod is present with which the crossbar is connected at a middle valve-rod connection point of the crossbar. The valve-plate connection points lay on both sides of this middle valve-rod connection point, for example, on both sides of the middle valve-rod connection point there is a single side valve-plate connection point or two side valve-plate connection points are provided on both sides of the middle valve-rod connection point.

In another embodiment of the invention, at least two, advantageously exactly two, valve rods are provided that lie parallel to each other. The middle section of the crossbar in which this is spaced apart from the valve plate extends in this case across the region of the crossbar lying between the valve-rod connection points and past this region on both sides.

BRIEF DESCRIPTION OF THE SEVERAL
VIEWS OF THE DRAWINGS

Additional advantages and details of the invention will be explained below with reference to the accompanying drawing.

Figure 6:
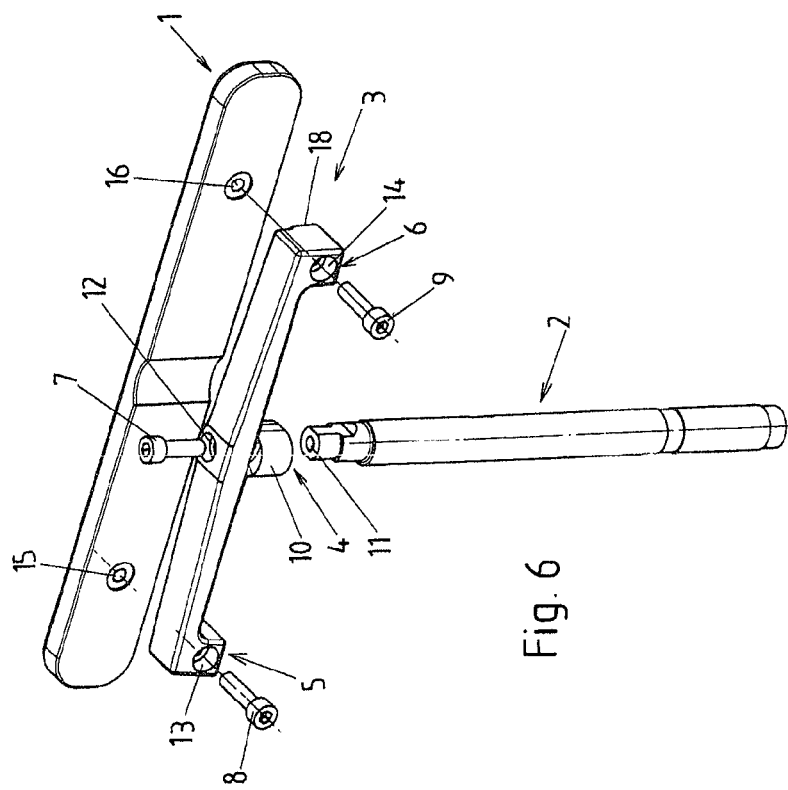
Figure 7:
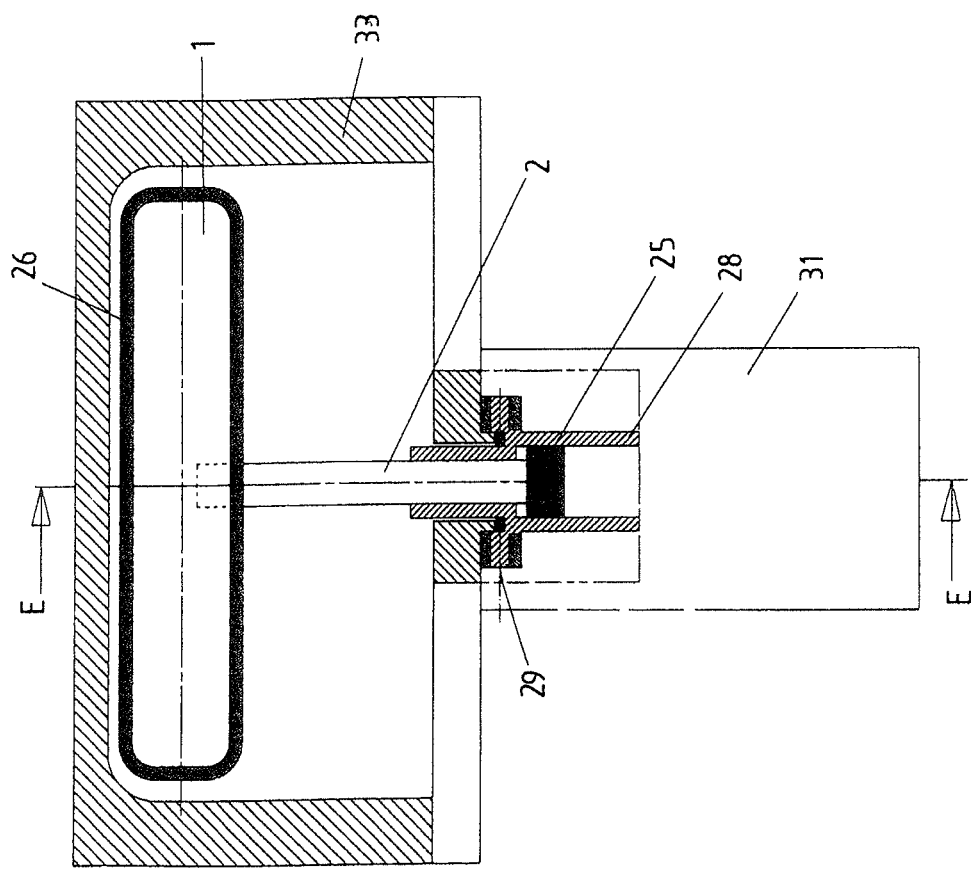
Figure 24:
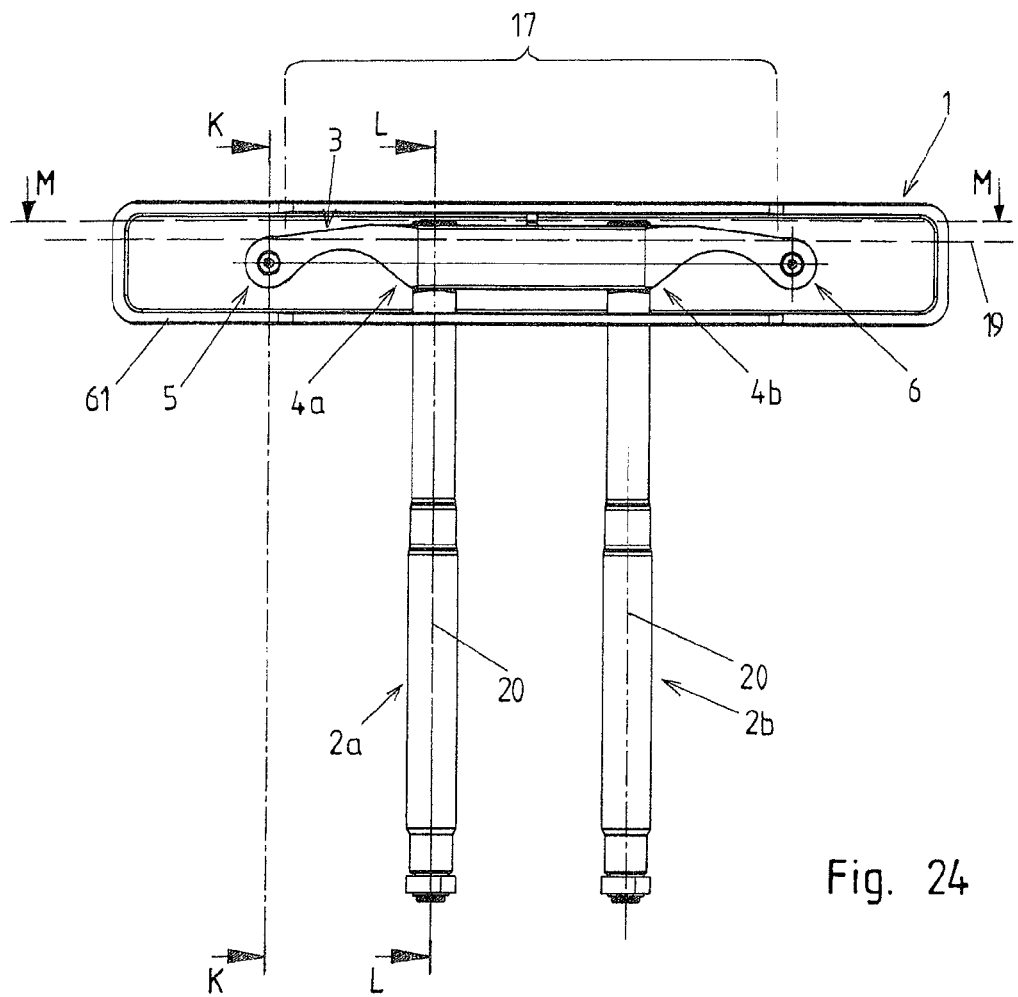
Figure 27:
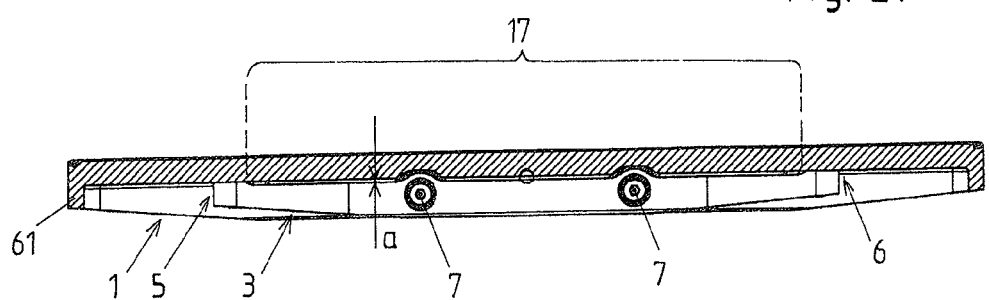

Shown in the drawing are:

FIG. 1 is a front view of a valve plate suspended on a valve rod in a way according to the invention, FIG. 2 is a bottom view of these parts (taken in the direction A in FIG. 1), FIG. 3 is an enlarged cutout indicated at B from FIG. 2, FIG. 4 is a section view along the line C-C from FIG. 1, FIG. 5 is a section view along the line DD from FIG. 1, FIG. 6 is a perspective view in the form of an exploded-view diagram, FIG. 7 is a schematic diagram of an L-valve in which the suspension of FIGS. 1 to 6 can be used, in a front view, partially cut away, FIG. 8 is a section view along the line E-E from FIG. 7, FIG. 9 is a front view of another possible embodiment of an L-valve with a suspension corresponding to FIGS. 1 to 6, in a front view, FIG. 10 is a section along the line F-F from FIG. 9, FIG. 11 is an enlarged detail G from FIG. 10, FIG. 12 is a perspective view of the vacuum valve, FIG. 13 is a perspective view of the valve drive of the vacuum valve with the valve rod, FIG. 14 is a perspective view of the valve drive of the vacuum valve with the valve rod in the form of an exploded-view diagram, FIGS. 15, 16, and 17 are a side view, front view, and bottom view of a valve plate according to a second embodiment of the invention suspended on a valve rod in a manner according to the invention, FIG. 18 is a section view along the line H-H from FIG. 16, FIG. 19 is an enlarged detail I from FIG. 17, FIG. 20 is an enlarged detail J from FIG. 17, FIG. 21 is a front view of a valve plate with a crossbar formed integrally on this plate, an end section of a valve rod, and a connection screw according to a third embodiment of the invention, FIGS. 22 and 23 are a top view and a perspective view of the valve plate with the formed crossbar, FIG. 24 is a front view of a valve plate suspended on two valve rods in a way according to the invention corresponding to a fourth embodiment of the invention, FIGS. 25, 26, and 27 are section views along the lines K-K, L-L, and M-M from FIG. 24, FIG. 28 is a perspective view of the parts from FIG. 24, FIG. 29 is a perspective view corresponding to FIG. 28, but with the valve rods detached from the crossbar, FIG. 30 is a perspective view corresponding to FIG. 29 without the valve rods and the crossbar detached from the valve plate, and FIG. 31 is a perspective view of the parts from FIG. 24 from a viewing angle that is different from FIG. 28.

DETAILED DESCRIPTION FOR THE
PREFERRED EMBODIMENTS

In the figures, for the different embodiments, analogous parts are provided with the same reference symbols.

A first embodiment of a suspension according to the invention of a valve plate 1 on a valve rod 2 is shown in FIGS. 1 to 6. The suspension is realized by a crossbar 3 that is connected rigidly to the valve rod 2 at a middle valve-rod connection point 4 and rigidly to the valve plate 1 at side valve-plate connection points 5, 6 lying on both sides of the middle valve-rod connection point 4. The connections to the valve plate 1 and the valve rod 2 are each realized directly or indirectly, i.e., the crossbar 3 contacts the valve rod 2 at the middle valve-rod connection point 4 and contacts the valve plate 1 at the side valve-plate connection points 5, 6.

Both the connection to the valve rod 2 and also the connections to the valve plate 1 are realized in this embodiment by connection screws 7, 8, 9.

In this embodiment, for connecting to the valve rod 2, the crossbar 3 has a tappet 10 with a receptacle opening in which the end section of the valve rod 2 can be inserted. The valve rod 2 is provided on the end with a threaded drill hole 11 in which the connection screw 7 can be screwed, wherein this screw can be inserted through a passage drill hole 12 reaching into the receptacle opening. The valve rod 2 is secured advantageously against twisting in the receptacle opening of the tappet 10.

In this embodiment, for connecting to the valve plate 1, passage drill holes 13, 14 through which the connection screws 8, 9 are inserted are constructed in side end sections of the crossbar 3. The connection screws 8, 9 are further screwed into threaded drill holes 15, 16 of the valve plate 1.

In a middle section 17 of the crossbar 3 that extends across the region of the valve-rod connection point 4 and across adjacent sections at the sides of this connection point up to projections 18 that are constructed in the region of the side valve-plate connection points 5, 6, the crossbar 3 is spaced apart from the valve plate 1. This distance a (whose magnitude can vary) is shown as an example at one point in FIG. 3. The side ends of the crossbar 3 with the valve-plate connection points 5, 6 have an angled construction in the shown embodiment. Other constructions, for example, straight ends (cf. the embodiment described farther below according to FIGS. 15 to 20) are conceivable and possible.

Due to an applied torque, the valve plate 1 can be pivoted about an imaginary pivot axis 19, for example, in the range of +/−1°. The pivot axis 19 lies at a right angle to the longitudinal axis 20 of the valve rod 2 and parallel to the main plane of the valve plate 1. Such a torque acting about the pivot axis 19 is produced when the valve plate 1 is pressed via the valve rod 2 onto a valve seat and the valve rod 2 is bent in this way. The pivoting about the pivot axis 19 is here realized by a twisting of the crossbar 3. For example, for a torque exerted about the pivot axis 19 in the magnitude of 80 Nm, a pivoting of the valve plate 1 relative to the valve rod 2 about the pivot axis 19 by a pivot angle of 0.4° can be generated.

The pivoting of the valve plate 1 relative to the valve rod 2 about the pivot axis 19 is made possible by the elasticity of the material from which the crossbar 3 is made. Advantageously, the crossbar 3 is made here from metal.

Starting from the zero position in which no external forces act on the valve plate 1 relative to the valve rod 2, a pivoting of the valve plate 1 about the pivot axis 19 of at least 0.5°, advantageously at least 1°, is possible, wherein, at the end of the applied external forces, the valve plate is returned back to the zero position. The pivoting is thus realized at least in this region by an elastic deformation of the crossbar 3.

Starting from the zero position in which no external forces act on the valve plate 1 relative to the valve rod 2, the working pivot angle is, in practice, less than 3°, usually less than 1°.

In the illustrated embodiment, the crossbar has a single-material construction, thus it is not made from several parts that are connected to each other——for example, by a material fit. A construction made from several parts that are connected to each other—for example, by a material fit—however, is conceivable and possible.

The connection screw 7 by which the crossbar 3 is connected to the valve rod 2 in the shown embodiment lies parallel to the longitudinal axis 20 of the valve rod 2 and at a right angle to the pivot axis 19. The connection screws 8, 9 by which the crossbar 3 is connected to the valve plate 1 in the shown embodiment stand at a right angle to the plane of the valve plate 1 and at a right angle to the pivot axis 19.

For sealing the valve plate 1 relative to a valve seat, an elastic seal 26 is arranged on the valve plate 1. This seal could be formed, e.g., by an O-ring inserted into a groove or by a seal vulcanized onto the valve plate 1. On the other hand, an elastic seal could also be arranged on the valve seat and the valve plate 1 could be provided with a sealing face for interacting with the elastic seal.

Furthermore, in FIG. 1, a middle line 60 of the valve plate 1 lying parallel to the pivot axis 19 is drawn. The middle line 60 extends centrally between the two points at which the elastic seal 26 crosses the longitudinal axis 20 of the valve rod 2 (these are the two intersecting points of the elastic seal 26 visible in FIG. 4). If the elastic seal 26 has two sections running parallel to the pivot axis 19 and to the middle line 60 in the embodiment (connected at the edges by connection sections), then the middle line 60 lies in the middle between these two sections in a front view looking toward the valve plate (FIG. 1).

Advantageously, the pivot axis 19 is spaced apart from this middle line 60 of the valve plate 1 lying parallel to the pivot axis 19. The distance b is drawn in FIG. 1. This distance b advantageously equals at least one fifth of the distance between the two intersecting points of the elastic seal 26 with the longitudinal axis 20 of the valve rod 2. The pivot axis 19 is here spaced apart from the middle line 60 in a direction that is opposite the direction in which the valve rod 2 is spaced apart from the crossbar 3.

Due to this distance of the pivot axis 19 from the middle line 60, in the closed state, a more uniform contact pressure of the elastic seal 26 can be achieved. Advantageously, the distance b can be designed so that approximately equally large pressing forces act on the two sections of the seal 26 lying on opposite sides of the middle line 60 in the state of the valve plate 1 pressed onto the valve seat (the pressing forces advantageously differ by less than 20%).

If the seal 26 is arranged on the valve seat and the sealing face interacting with it is arranged on the valve plate 1, then what was stated previously for the position of the middle line 60 applies with reference to the sections of the sealing face interacting with the seal in the closed state of the valve.

The pivot axis 19 extends in the embodiment through the middle section of the crossbar 3 spaced apart from the valve plate 1.

In FIGS. 7 and 8, a possible embodiment of a vacuum valve is shown schematically in which a suspension according to the invention is used, wherein FIG. 8 shows the opened state and FIG. 7 shows the closed state of the vacuum valve.

Starting from an open position (FIG. 8) in which the valve plate 1 is free of a valve opening 22 arranged in a wall 21, the valve plate 1 can be moved by a first piston-cylinder unit 23 into an intermediate position in which it covers the valve opening 22 but is still lifted from the valve seat 24 surrounding the valve opening 22. When the valve plate 1 moves from its open position into its intermediate position, the valve rod 2 is shifted in the axial direction, thus the valve plate 1 is shifted in its main plane. The valve rod 2 is connected to the piston 25 of the first piston-cylinder unit 23, thus it could be viewed as a piston rod of the first piston-cylinder unit 23.

A second piston-cylinder unit 27 is used for moving the valve plate 1 from its intermediate position into its closed position in which it is pressed onto the valve seat 24 and in which an elastic seal 26 arranged on the valve plate 1 (this seal could also be arranged on the valve seat 24) seals the valve opening 22. This unit is connected to the cylinder 28 of the first piston-cylinder unit 23 that is supported so that it can pivot about an axis 29. The piston 30 of the second piston-cylinder unit 27 is supported on the drive housing 31 (that is connected rigidly to the wall 21), in order to pivot the cylinder 28 about the axis 29.

An elastic seal 59 arranged between the cylinder 28 and the valve housing 33 is used for sealing the cylinder 28 of the first piston-cylinder unit 23. Furthermore, the valve rod 2 is guided in a sealed manner out from the cylinder 28 (the seals are not shown for the sake of simplicity). Instead, for example, a bellows seal could also be provided that is connected, on one side, to the valve housing 33 in a sealed manner and, on the other side, to the valve rod 2 in a sealed manner.

For opening the vacuum valve, the piston 30 is moved inward, wherein a spring 32 pivots the cylinder 28 back and the valve plate 1 moves from its closed position into its intermediate position. Consequently, the valve plate 1 is moved into its open position by the first piston-cylinder unit 23.

In this embodiment, the wall 21 represents a part of a valve housing 33 with which the drive housing 31 is connected rigidly. In another embodiment, the wall 21 could also be part of a vacuum chamber, wherein the valve opening 22 is formed by an opening of the vacuum chamber. Furthermore, the valve housing 33 could also form a type of insert in which the wall 21 is inserted into the vacuum region of a vacuum chamber. Such a construction also follows in the additional embodiment described below for a vacuum valve with a suspension of the valve plate according to the invention on the valve rod.

This additional embodiment is shown in FIGS. 9 to 14. The valve housing 33 is here constructed as an insert for installation in a vacuum chamber 34 that is shown with dashed lines only in FIG. 10. Such an installation in a vacuum chamber 34 is known.

A drive housing 31 that has the actuators for opening and closing the vacuum valve is connected rigidly to the valve housing 33.

The valve plate 1 can be moved, in turn, from an open position in which it is free of the valve opening 22 via an intermediate position in which it covers the valve opening 22 but is lifted from the valve seat 24 surrounding the valve opening 22, into a closed position in which the elastic seal 26 arranged on the valve plate is pressed onto the sealing face provided on the valve seat 24. The seal 26 could also be arranged on the valve seat 24 and the sealing face on the valve plate 1.

First piston-cylinder units with piston 25 are used for moving the valve plate 1 from its open position into its intermediate position through a shifting of the valve rod 2 on which the valve plate 1 is suspended in a way according to the invention in its axial direction 36. These are connected to the valve rod 2 by a crosshead 35. The cylinder spaces for the pistons 25 are arranged in a support unit 37. The cylinder cover 58 covers the cylinder spaces for the pistons 25.

The support unit 37 is supported so that it can move relative to the drive housing 31 in and against the direction 38 that lies at a right angle to the axial direction 36 of the valve rod 2 and parallel to the axis 39 of the valve opening 22. The support unit 37 also guides the valve rod 2 so that it can move in and against the axial direction 36.

The shifting of the valve plate 1 from its intermediate position into its closed position is realized by a shifting of the support unit 37 in the direction 38 relative to the drive housing 31. Springs 40 arranged between the support unit 37 and the drive housing 31 are used for this purpose.

For opening the vacuum valve, the valve plate 1 is initially shifted from its closed position into its intermediate position, in that the support unit 37 is shifted against the direction 38 by the second piston-cylinder units that have pistons 30. The cylinder spaces 41 for the pistons 30 are constructed in the support unit 37. The pistons 30 are attached to piston rods 42 that are fixed on the drive housing 31 and passage openings penetrate through the support unit 37.

In order to increase the closing force with which the valve plate 1 is pressed onto the valve seat 24 in the closed state of the vacuum valve, it can be provided to charge spaces 43 lying between the drive housing 31 and the support unit 37 with a compressed medium, in particular, compressed air.

A bellows 44 is used for guiding the valve rod 2 out from the vacuum region.

In this embodiment, a section of the valve rod 2 that projects from the support unit 37 on the side facing away from the valve plate 1 is supported in the closed state of the vacuum valve in the end region of the valve rod on a stop 45. The stop 45 here lies on the same side of the valve rod 2 as the valve plate 1 and is arranged on the drive housing 31 or a part connected to this housing. The force transmission from the support unit 37 onto the valve plate 1 is therefore improved in the closed position of the valve plate 1.

In FIG. 11, the applied forces are shown schematically. The closing force F of, for example, 2000 N, shown above the valve rod 2 produces tilting of the valve rod 2, wherein a torque about the pivot axis 19 (cf. FIG. 9) is produced, for example, in the magnitude of 80 Nm, which leads to a twisting of the crossbar 3 and thus to a pivoting of the valve plate 1 about the pivot axis 19, for example, by 0.4°.

A second embodiment for a suspension of the valve plate 1 according to the invention on the valve rod 2 that can be used, for example, in the previously described L-valves, is shown in FIGS. 15 to 20. The difference to the embodiment shown in FIGS. 1 to 6 consists merely in the form of the crossbar 3. While this has an angled construction in the embodiment according to FIGS. 1 to 6 in its end section in which the side valve-plate connection points 5, 6 lay with the projections 18, the crossbar 3 has a straight construction at its ends in the embodiment according to FIGS. 15 to 20. In the region of the side valve-plate connection points 5, 6 there are, in turn, projections 18 and in the middle section 17 lying between these projections 18, the crossbar 3 is spaced apart from the valve plate 1 (cf. distance a in FIGS. 19 and 20).

In the region of the middle valve-rod connection point 4, for example, a tappet 10 can be provided, in turn, in which the valve rod 2 can be inserted at the end. The connections to the valve plate 1 and to the valve rod 2 are realized by connection screws 7, 8, 9.

Due to the elasticity of the crossbar 3, the valve plate 1 can be pivoted somewhat relative to the valve rod 2 about the pivot axis 19 with the twisting of the crossbar 3. For example, the pivoting range or the pivot angle occurring at a certain torque could be equal to the embodiment described with reference to FIGS. 1 to 6.

In this embodiment, the pivot axis 19 is preferably spaced apart, in turn, from the middle line 60 of the valve plate, cf. the distance b shown in FIG. 16. With respect to the position of the middle line 60 and its distance from the pivot axis 19, what was already stated with respect to the embodiment of FIGS. 1 to 6 is applicable.

Another embodiment of a suspension of a valve plate 1 according to the invention on a valve rod 2 is shown in FIGS. 21 to 23. The suspension is realized, in turn, by a crossbar 3 whose shape differs as described below from the crossbars of the previously described embodiments. Furthermore, in this embodiment the crossbar 3 has a single-material construction with the valve plate 1. A construction from separate parts that are connected to each other, for example, by a material fit, e.g., by welding, however, is likewise possible. A construction made from separate parts and a connection by screws is also conceivable and possible.

The crossbar 3 is connected in the region of a middle valve-rod connection point 4 to the valve rod 2. For this purpose, an end section of the valve rod is inserted into a recess 46 in a middle connection piece 47 of the crossbar 3 and is held in this recess by a connection screw 47 that passes through a passage drill hole 12 through the middle connection piece of the crossbar 3 and is screwed into a threaded drill hole of the valve rod 2. Arms 48, 49 that extend up to branch points 50, 51 project from the middle connection piece 47 on both sides. A first and a second branch section 52, 53 that extend up to the side valve-plate connection points 54, 55 or 56, 57 at which the crossbar 3 is connected to the valve plate 1 project from the branch points.

The crossbar 3 is spaced apart from the valve plate 1 across the middle section 17 of the crossbar 3, with this section encompassing the middle connection piece 47 and the arms 48, 49 projecting from it on both sides. The branch sections 52, 53 projecting from the branch points 50, 51 are initially likewise spaced apart from the valve plate 1 and approach this plate more and more toward the valve-plate connection points 54-57. For the shown single-material construction of the valve plate 1 with the crossbar 3, the valve-plate connection points 54-57 are formed by material bridges.

Each branch section 52 is more and more removed from the middle valve-rod connection point 4 across its profile from the corresponding branch position 50 or 51 to the valve-plate connection point 54 or 56. In this sense it continues each arm 48, 49. Each branch section 53 more and more approaches the middle valve-rod connection point 4 across its profile from the corresponding branch point 50 or 51 to the valve-plate connection point 55 or 57.

Thus, in this embodiment, on both sides of the middle valve-rod connection point 4 there are two side valve-plate connection points 54, 55 and 56, 57, respectively. In this way, a more uniform force transmission to the valve plate 1 can be achieved, so that this can be constructed with a smaller material thickness.

More than two, that is, more than a total of four side valve-plate connection points 54-57 could also be constructed by corresponding branch sections.

Through a twisting of the crossbar 3, the valve plate 1 could be pivoted somewhat relative to the valve rod 2 about the pivot axis 19. The pivoting range and the magnitude of the pivot angle for a certain torque acting about the pivot axis 19 can here be equal, for example, as in the previously described embodiments. The twisting of the crossbar 3 is realized mainly in the region of the arms 48, 49. These have a correspondingly thin construction for this purpose.

For example, the unit consisting of the valve plate 1 and crossbar 3 could be produced through extrusion molding (in connection with additional processing steps).

A fourth embodiment of a suspension of a valve plate 1 according to the invention is shown in FIGS. 24 to 31. Apart from the differences described below, this embodiment corresponds, in particular, to the embodiments described with reference to FIGS. 1 to 20. The valve plate 1 is here suspended on two valve rods 2a, 2b that are oriented parallel to each other. Their longitudinal axes 20 are thus parallel. The suspension is realized, in turn, by a crossbar 3, wherein a pivoting of the valve plate 1 relative to the valve rods 2a, 2b about a pivot axis 19 standing at a right angle to the valve rods 2a, 2b is made possible by a torsion of the crossbar 3.

The middle section 17 across which the crossbar 3 has a spacing a from the valve plate 1 here extends across the section of the crossbar 3 lying between the valve-rod connection points 4a, 4b and across adjacent sections of the crossbar 3 on both sides of these connection points.

In this embodiment, the crossbar 3 has a region with a smaller material thickness in which the torsion is primarily realized in this middle section between the corresponding valve-rod connection points 4a, 4b and the adjacent side valve-plate connection points 5, 6. In this region, the crossbar 3 could run at an angle to the connection line between the side connection points 5, 6 or to the pivot axis 19, wherein a parallel profile is also conceivable and possible for this purpose. Apart from having two valve-rod connection points 4a, 4b, the crossbar could also have a shape that corresponds to one of the previously described embodiments. Here, among other things, a single-material construction of the crossbar 3 with the valve plate 1 would also be conceivable and possible (corresponding to the embodiment of FIGS. 21 to 23).

This fourth embodiment can be used, for example, in an L-valve that is constructed analogous to the L-valves described in FIGS. 7 to 8 or 12 to 14. For the L-valve described in FIGS. 7 to 8, a separate piston-cylinder unit corresponding to the piston-cylinder unit 23 could be present for each of the valve rods 2a, 2b. The two valve rods 2a, 2b could also be connected by a crosshead that is connected to the piston rod of an individual piston-cylinder unit corresponding to the piston-cylinder unit 23. In the L-valve shown in FIGS. 12 to 14, the two valve rods 2a, 2b could likewise be connected by a crosshead that is connected to pistons corresponding to the pistons 25.

In additional embodiments of the invention, more than two parallel valve rods 2a, 2b could also be provided with which the crossbar 3 is connected rigidly at valve-rod connection points. The middle section 17 of the crossbar across which this is spaced apart from the valve plate 1 would then extend across a region of the crossbar 3 that lies between the two outer-lying valve-rod connection points (that are the two valve-rod connection points spaced farthest apart from each other) and across adjacent sections on both sides of this region.

In the embodiment shown in FIGS. 24 to 31, a peripheral wall 61 projects from the valve plate 1 on the side on which it is connected to the crossbar 3 at the edge. The stability relative to bending of the valve plate 1 is therefore increased. The wall 61 has openings 62 through which the valve rods 2a, 2b pass with play, in order to allow a pivoting of the valve plate 1 about the pivot axis 19 relative to the valve rods 2a, 2b.

For simplifying the screwing of the valve rods 2a, 2b with the crossbar 3, openings 63 are likewise preferably arranged on the side of the wall 61 lying opposite the openings 62.

The wall 61 could also surround the valve plate 1 only partially.

Such a wall surrounding the valve plate 1 at least partially, optionally with an opening 62 and/or 63, could also be provided in the previously described embodiments with only a single valve rod 2.

In all of the described embodiments, the pivot axis 19 lies at a right angle to the longitudinal axis 20 of the at least one valve rod 2 and the crossbar 3 has its greatest extent in the direction of the pivot axis 19. Advantageously, the extent of the crossbar 3 in the direction of the pivot axis 19 is at least 5 times greater than in all of the directions at a right angle to this.

All of the described embodiments of suspensions of valve plates 1 on valve rods 2 can be used in connection with the described types of L-valves. These suspensions could also be used in other valves, for example, L or shuttle valves, in particular, in valves with freely projecting valve rods by which a contact force of the valve plate is transmitted onto the valve seat.

Advantageously, the valve plate 1 has, in the direction of the pivot axis 19, a greater extent than in the direction of the longitudinal axis 20 of the at least one valve rod 2 (with respect to the orientation in which the main plane of the valve plate 1 lies parallel to the pivot axis 19 and to the at least one valve rod 20). The extent in the direction of the pivot axis 19 is here advantageously at least 3 times as large, especially preferred at least 5 times as large, as the extent in the direction of the longitudinal axis 20 of the at least one valve rod 2.

For example, the extent of the valve plate 1 in the direction of the pivot axis 19 lies in the range between 200 and 400 mm and the extent in the direction of the longitudinal axis 20 lies in the range between 30 and 80 mm.

The connection of the crossbar 3 to the at least one valve rod 2 could also be realized in a manner that is different than in the embodiments. For example, the crossbar 3 could also have a projection that points in the direction of the longitudinal axis of the valve plate 20 and can be inserted into a receptacle opening of the at least one valve rod 2.

Legend to the Reference Symbols:
1 Valve plate
2, 2a, 2b Valve rod
3 Crossbar
4, 4a, 4b Valve-rod connection point 5 Valve-plate connection point
6 Valve-plate connection point
7 Connection screw
8 Connection screw
9 Connection screw
10 Tappet
11 Threaded borehole
12 Passage borehole
13 Passage borehole
14 Passage borehole
15 Threaded borehole
16 Threaded borehole
17 Middle section
18 Projection
19 Pivot axis
20 Longitudinal axis
21 Wall
22 Valve opening
23 First piston-cylinder unit
24 Valve seat
25 Piston
26 Seal
27 Second piston-cylinder unit
28 Cylinder
29 Axis
30 Piston
31 Drive housing
32 Spring
33 Valve housing
34 Vacuum chamber
35 Crosshead
36 Axial direction
37 Support unit
38 Direction
39 Axis
40 Spring
41 Cylinder space
42 Piston rod
43 Space
44 Bellows
45 Stop
46 Recess
47 Connection piece
48 Arm
49 Arm
50 Connection point
51 Connection point
52 Branch section
53 Branch section
54 Valve-plate connection point
55 Valve-plate connection point
56 Valve-plate connection point
57 Valve-plate connection point
58 Cylinder cover
59 Seal
60 Middle line
61 Wall
62 Opening
63 Opening

The invention claimed is:

1. A valve plate suspension system comprising a valve plate supported on at least one valve rod by a crossbar extending transverse to the valve rod, the crossbar is connected to the valve plate at lateral valve-plate connection points and the at least one valve rod is connected to the crossbar at at least one valve-rod connection point of the crossbar lying between the lateral valve-plate connection points, and the crossbar has a spacing (a) from the valve plate in a middle section of the crossbar, with the middle section encompassing the at least one valve-rod connection point and adjacent sections of the crossbar on both sides of the at least one valve-rod connection point, and the valve plate is pivotable about a pivot axis that extends at a right angle to the valve rod relative to the at least one valve rod through a torsion of the crossbar that occurs when at least one end of the valve rod is fixed and the valve plate pivots relative to the at least one valve rod around the pivot axis so that the crossbar twists, a cross-section of the crossbar being progressively rotated with larger angles of rotation with increasing distance from the fixed end of the valve rod.

2. The valve plate suspension system according to claim 1, wherein the crossbar has a single-material construction.

3. The valve plate suspension system according to claim 1, wherein the at least one valve-rod connection point of the crossbar to the valve rod includes at least one connection screw.

4. The valve plate suspension system according to claim 1, wherein the crossbar and the valve plate have single-material constructions.

5. The valve plate suspension system according to claim 1, wherein the lateral valve-plate connection points of the crossbar to the valve plate are formed by connection screws.

6. The valve plate suspension system according to claim 1, wherein the crossbar is connected to the valve plate by two of the valve-plate connection points of which one lies on one side and the other lies on the other side of the at least one valve-rod connection point.

7. The valve plate suspension system according to claim 1, wherein the crossbar is connected to the valve plate by four of the valve-plate connection points of which two of the valve-plate connection points lie on one side and the other two of the valve-plate connection points lie on the other side of the at least one valve-rod connection point.

8. The valve plate suspension system according to claim 1, wherein a pivoting of the valve plate is realized relative to the at least one valve rod about the pivot axis of at least 0.2° by a torque of 80 Nm acting on the crossbar about the pivot axis.

9. The valve plate suspension system according to claim 8, wherein a pivoting about the pivot axis of at least 0.3° is realized by a torque of 80 Nm acting on the crossbar about the pivot axis.

10. The valve plate suspension system according to claim 1, wherein the pivot axis has a distance (b) from a middle line that lies parallel to the pivot axis and extends, for an arrangement in which an elastic seal is located on the valve plate, centrally between intersecting points of the elastic seal with a longitudinal axis of the at least one valve rod or extends, for an arrangement in which a sealing face on the valve plate is provided for interacting with an elastic seal arranged on a valve seat, centrally between intersecting points that have sections of the sealing face provided for interacting with the elastic seal with the longitudinal axis of the at least one valve rod.

11. The valve plate suspension system according to claim 1, wherein the at least one valve rod is a single valve rod and the valve-rod connection point is centrally located.

12. The valve plate suspension system according to claim 1, wherein the at least one valve rod comprises two parallel valve rods, each of which is connected to the crossbar at the valve-rod connection points.

13. Vacuum valve comprising a valve plate and at least one valve rod on which the valve plate is suspended and by which the valve plate can be adjusted between an open position in which the vacuum valve is opened and a closed position in which the vacuum valve is closed and the valve plate seals a valve opening, a crossbar is connected to the valve plate at lateral valve-plate connection points and the at least one valve rod is connected to the crossbar at at least one valve-rod connection point of the crossbar lying between the lateral valve-plate connection points, and the crossbar has a spacing (a) from the valve plate in a middle section that encompasses the at least one valve-rod connection point of the crossbar and adjacent sections of the crossbar on both sides of this connection point, and the valve plate is pivotable relative to the at least one valve rod by a torsion of the crossbar that occurs when at least one end of the valve rod is fixed and the valve plate pivots relative to the at least one valve rod about a pivot axis that extends at a right angle to the valve rod so that the crossbar twists, a cross-section of the crossbar being progressively rotated with larger angles of rotation with increasing distance from the fixed end of the at least one valve rod.

14. The vacuum valve according to claim 13, wherein the valve plate can be moved starting from an open position in which it is located free of a valve opening by at least one first piston-cylinder unit shifting the at least one valve rod in an axial direction into an intermediate position in which it covers the valve opening but is lifted from a valve seat surrounding the valve opening, and the valve plate can be moved starting from the intermediate position by at least one second piston-cylinder unit by which the at least one valve rod can be pivoted about an axis or can be moved in a direction at a right angle to a longitudinal axis thereof into a closed position in which the valve plate is pressed onto the valve seat.

* * * * *